United States Patent [19]
Watanabe et al.

[11] Patent Number: 5,852,111
[45] Date of Patent: Dec. 22, 1998

[54] POLYISOCYANATE COMPOSITION HAVING HIGH EMULSIFIABILITY AND STABILITY, AND AQUEOUS COATING COMPOSITION COMPRISING THE COMPOSITION

[75] Inventors: Shinichiro Watanabe; Ichiro Ibuki, both of Nobeoka, Japan

[73] Assignee: Asahi Kasei Kogyo Kabushiki Kaisha, Osaka, Japan

[21] Appl. No.: 945,016

[22] PCT Filed: Jun. 28, 1996

[86] PCT No.: PCT/JP96/01791

§ 371 Date: Oct. 10, 1997

§ 102(e) Date: Oct. 10, 1997

[87] PCT Pub. No.: WO97/02303

PCT Pub. Date: Jan. 23, 1997

[30] Foreign Application Priority Data

Jun. 30, 1995 [JP] Japan .................................. 7-164998

[51] Int. Cl.⁶ ................................ C08J 3/00; C08K 3/20; C08L 75/00
[52] U.S. Cl. ..................... 524/839; 524/196; 524/507; 524/589; 524/590; 524/591; 524/840
[58] Field of Search ..................... 524/589, 590, 524/591, 839, 840, 196, 507

[56] References Cited

U.S. PATENT DOCUMENTS 4,663,377  5/1987  Hombach et al. ...................... 524/196
5,252,696 10/1993  Laas et al. ................................ 528/49

FOREIGN PATENT DOCUMENTS 0 557 844 A1  2/1993  European Pat. Off. .

*Primary Examiner*—Patrick D. Niland
*Attorney, Agent, or Firm*—Pennie & Edmonds LLP

[57] ABSTRACT

Disclosed is a polyisocyanate composition which comprises: (a) a hydrophilic polyisocyanate comprising at least one base polyisocyanate selected from an aliphatic and/or an alicyclic diisocyanate, and a polyisocyanate derived therefrom, and a nonionic hydrophilic group, bonded to the polyisocyanate, containing therein 5 to 50 repeating ethylene oxide units in terms of the average number of the units, wherein the hydrophilic group is present in an amount of from 2 to 50% by weight, based on the total weight of the base polyisocyanate and the hydrophilic group; and (b) 0.5 to 20% by weight, based on the total weight of components (a) and (b), of a substantially water-free ionic surfactant. The polyisocyanate composition exhibits not only excellent dispersibility in water, but also exhibits high stability in the form of an aqueous dispersion thereof, since a reaction between the terminal isocyanate groups and water is suppressed. Further, a cold crosslinkable, two-pack aqueous urethane coating composition, which comprises an aqueous polyol as a main agent and the polyisocyanate composition as a curing agent, has not only excellent pot life characteristics, but also is capable of forming a coating which has excellent properties, such as excellent water resistance, so that such an aqueous coating composition can be advantageously used as various aqueous paints, adhesives, building materials and sealing materials.

15 Claims, No Drawings

POLYISOCYANATE COMPOSITION HAVING HIGH EMULSIFIABILITY AND STABILITY, AND AQUEOUS COATING COMPOSITION COMPRISING THE COMPOSITION

TECHNICAL FIELD

The present invention relates to a novel highly emulsifiable polyisocyanate composition, and a cold crosslinkable, two-pack aqueous urethane coating composition, which comprises an aqueous polyol and the highly emulsifiable polyisocyanate composition. More particularly, the present invention is concerned with a novel highly emulsifiable and stable polyisocyanate composition, which comprises (a) a hydrophilic polyisocyanate comprising at least one base polyisocyanate having a nonionic hydrophilic group bonded thereto, wherein the base polyisocyanate is selected from an aliphatic and/or an alicyclic diisocyanate, and a polyisocyanate derived therefrom, and (b) a substantially water-free ionic surfactant. The present invention is also concerned with a cold crosslinkable, two-pack aqueous urethane coating composition, which comprises an aqueous polyol as a main agent, and the above-mentioned novel polyisocyanate composition as a curing agent. The aqueous coating composition of the present invention has not only excellent pot life characteristics, but also is capable of forming a coating which has excellent properties, such as excellent water resistance. Therefore, the aqueous coating composition of the present invention can be advantageously used as an aqueous paint for building materials or automobiles, an aqueous paint for domestic use, an adhesive, a building material, and various other coating materials and sealing materials. Further, the aqueous coating composition of the present invention can also be used as a crosslinking agent for use in a vehicle for an ink, a curing agent for use in cast molding, a crosslinking agent for a resin component such as an elastomer and for a urethane foam or the like, and a finish coating agent for a fiber and a textile fabric.

PRIOR ART

In recent years, guidelines on volatile organic compounds have been becoming strict increasingly, and in countries including the United States and Germany, the use of volatile organic compounds has already been restricted. Therefore, it has been desired to develop a cold crosslinkable, two-pack aqueous urethane coating composition as a substitute for conventional cold crosslinkable, two-pack non-aqueous urethane coating compositions which contain an organic solvent. However, a polyisocyanate which is used as a curing agent in a 2-pack urethane coating composition has problems in that it has poor dispersibility in water and is likely to react with water to generate carbon dioxide.

For this reason, in Examined Japanese Patent Application Publication No. 55-7472 (corresponding to U.S. Pat. No. 3,996,154) and Unexamined Japanese Patent Application Laid-Open Specification No. 5-222150 (corresponding to U.S. Pat. No. 5,252,696), for obtaining a highly emulsifiable polyisocyanate, it is proposed to introduce a nonionic hydrophilic group into a polyisocyanate. In order to improve the dispersibility of a polyisocyanate, Unexamined Japanese Patent Application Laid-Open Specification No. 6-17004 proposes the use of a modified aqueous polyol as a main component for a coating composition, wherein the modified polyol has, introduced therein, a specific carboxylic acid group or a sulfonic acid group which can impart emulsifiability to a polyisocyanate. In Unexamined Japanese Patent Application Laid-Open Specification No. 7-48429 (corresponding to U.S. Pat. No. 5,373,050) and Unexamined Japanese Patent Application Laid-Open Specification No. 7-113005, a polyisocyanate having introduced therein both a nonionic hydrophilic group and a nonionic oleophilic group, is proposed in order to prolong the pot life of a urethane coating composition.

However, since the above-mentioned conventional polyisocyanates have only a nonionic hydrophilic group as a hydrophilic group, not only is there a problem that when these polyisocyanates are dispersed in water, a reactivity between an isocyanate group and water cannot be satisfactorily suppressed, but also a coating composition having a pot life at a practically employable level, cannot be obtained. Further, these conventional polyisocyanates have a defect in that coatings obtained from coating compositions containing these polyisocyanates as a crosslinkable component have poor water resistance.

SUMMARY OF THE INVENTION

The present inventors have made extensive and intensive studies with a view toward solving the above-mentioned problems accompanying the conventional highly emulsifiable polyisocyanates, and developing a polyisocyanate which is not only highly emulsifiable, but also advantageous in that, even when it is dispersed in water, a reaction between an isocyanate group and water is suppressed. As a result, it has unexpectedly been found that a polyisocyanate composition, which comprises (a) a hydrophilic polyisocyanate comprising at least one base polyisocyanate having a nonionic hydrophilic group bonded thereto, wherein the base polyisocyanate is selected from an aliphatic and/or an alicyclic diisocyanate, and a polyisocyanate derived therefrom, and (b) a substantially water-free ionic surfactant, exhibits not only excellent dispersibility in water but also exhibits high stability in the form of an aqueous dispersion thereof, since a reaction between the terminal isocyanate group and water is suppressed. Further, the present inventors have found that a cold crosslinkable, two-pack aqueous urethane coating composition, which comprises an aqueous polyol as a main agent, and the above-mentioned novel polyisocyanate composition of the present invention as a curing agent, has not only excellent pot life characteristics, but also is capable of forming a coating which has excellent properties, such as excellent water resistance, so that such an aqueous coating composition can be advantageously used as various aqueous paints, adhesives, building materials, and sealing materials. The present invention has been completed, based on these novel findings.

Accordingly, it is an object of the present invention to provide a highly emulsifiable and stable polyisocyanate composition, which exhibits not only excellent dispersibility in water, but also exhibits high stability in the form of an aqueous dispersion thereof, since a reaction between the terminal isocyanate group and water is suppressed.

It is another object of the present invention to provide an aqueous coating composition, which has not only excellent pot life characteristics, but also is capable of forming a coating which has excellent properties, such as excellent water resistance.

The foregoing and other objects, features and advantages of the present invention will be apparent from the following detailed description and appended claims.

DETAILED DESCRIPTION OF THE INVENTION

In one aspect of the present invention, there is provided a polyisocyanate composition which comprises:

(a) a hydrophilic polyisocyanate comprising:
   at least one base polyisocyanate selected from the group consisting of at least one diisocyanate selected from an aliphatic diisocyanate and an alicyclic diisocyanate, and a two or more terminal isocyanate groups-containing polyisocyanate derived from the at least one diisocyanate, and
   a nonionic hydrophilic group, bonded to the polyisocyanate, containing therein 5 to 50 repeating ethylene oxide units in terms of the average number of the units, wherein the hydrophilic group is present in an amount of from 2 to 50% by weight, based on the total weight of the base polyisocyanate and the hydrophilic group; and
(b) 0.5 to 20% by weight, based on the total weight of component (a) and component (b), of a substantially water-free ionic surfactant.

In another aspect of the present invention, there is provided an aqueous coating composition comprising:
(A) an aqueous solution of or an aqueous emulsion of a polyol having a hydroxyl value of from 1 to 300 mg KOH/g; and
(B) the above-mentioned polyisocyanate composition,
   wherein the equivalent ratio (NCO/OH) of the isocyanate groups of component (B) to the hydroxyl groups of component (A) is 0.5–5.0, and
   wherein the components (A) and (B) are separately provided and are adapted to be mixed in use.

Hereinbelow, the present invention is described in detail.

Examples of aliphatic diisocyanates and alicyclic diisocyanates to be used in the present invention include tetramethylene diisocyanate, pentamethylene diisocyanate, hexamethylene diisocyanate, trimethylhexamethylene diisocyanate, lysine diisocyanate, isophorone diisocyanate, hydrogenated xylene diisocyanate, and 1,4-diisocyanatocyclohexane. Of these diisocyanates, hexamethylene diisocyanate, isophorone diisocyanate and hydrogenated xylene diisocyanate are more preferred because they are commercially easily available.

Examples of two or more terminal isocyanate groups-containing polyisocyanates derived from at least one diisocyanate selected from an aliphatic diisocyanate and an alicyclic diisocyanate include polyisocyanates having, in molecules thereof, a biuret structure, an isocyanurate structure, a urethane structure, a urethodione structure and an allophanate structure, respectively.

In the present invention, the term "base polyisocyanate" means a polyisocyanate having no nonionic hydrophilic group bonded thereto, which polyisocyanate is selected from the group consisting of an aliphatic diisocyanate and/or an alicyclic diisocyanate, and a two or more terminal isocyanate groups-containing polyisocyanate derived from the diisocyanate.

With respect to a method for producing, from the diisocyanate, the above-mentioned polyisocyanates having, in molecules thereof, a biuret structure, an isocyanurate structure, a urethane structure, a urethodione structure and an allophanate structure, respectively, reference can be made to, for example, Examined Japanese Patent Application Publication No. 64-10023, Unexamined Japanese Patent Application Laid-Open Specification No. 58-38713, Examined Japanese Patent Application Publication No. 63-89574, Unexamined Japanese Patent Application Laid-Open Specification No. 6-95041, Unexamined Japanese Patent Application Laid-Open Specification No. 4-306218, Japanese Patent Application No. 6-133321 and U.S. Pat. No. 3,124,605. A polyisocyanate having a biuret structure has excellent adhesion properties. A polyisocyanate having an isocyanurate structure has excellent weathering properties. A polyisocyanate having a urethane structure, which is produced using an alcohol having a long pendant chain, has high elasticity and excellent elongation properties. A polyisocyanate having a urethodione structure or an allophanate structure has a low viscosity.

The hydrophilic polyisocyanate as component (a) of the polyisocyanate compositions of the present invention comprises:
   at least one base polyisocyanate selected from the group consisting of at least one diisocyanate selected from an aliphatic diisocyanate and an alicyclic diisocyanate, and a two or more terminal isocyanate groups-containing polyisocyanate derived from the at least one diisocyanate, and
   a nonionic hydrophilic group, bonded to the polyisocyanate, containing therein 5 to 50 repeating ethylene oxide units in terms of the average number of the units, wherein the hydrophilic group is present in an amount of from 2 to 50% by weight, based on the total weight of the base polyisocyanate and the hydrophilic group.

The nonionic hydrophilic group, bonded to the polyisocyanate, containing therein 5 to 50 repeating ethylene oxide units in terms of the average number of the units, is a group derived from a compound comprising a poly ($C_1$–$C_{20}$ alkylene)oxide monoalkyl ether alcohol containing therein 5 to 50 repeating ethylene oxide units in terms of the average number of the units. Examples of such nonionic hydrophilic groups include a group derived from a polyethylene glycol mono($C_1$–$C_{20}$ alkyl) ether, such as polyethylene glycol monoethyl ether; a group derived from a compound obtained by bonding a polypropylene oxide group, polytetramethylene oxide group or the like to the above-mentioned polyethylene glycol mono ($C_1$–$C_{20}$ alkyl) ether at a position intermediate both terminals of the repeating ethylene oxide units, or at one terminal or both terminals of the repeating ethylene oxide units by an addition reaction and substituting a hydroxyl group of these oxides with an alkyl ether; and a group derived from a compound obtained by subjecting an ethylene oxide and a propylene oxide or tetrahydrofuran or the like to random polymerization to obtain a random copolymer and substituting a hydroxyl group of the random copolymer with a ($C_1$–$C_{20}$ alkyl) ether. From the viewpoint of ease in availability, as the nonionic hydrophilic group, a group derived from polyethylene glycol monomethyl ether containing 5 to 50 repeating ethylene oxide units in terms of the average number of the units is most preferred. When the average number of the repeating ethylene oxide units of the nonionic hydrophilic group is less than 5, there is a problem that the final polyisocyanate composition cannot exhibit highly emulsifiable properties. When the average number of the repeating ethylene oxide units of the nonionic hydrophilic group is more than 50, there is a problem that the hydrophilic polyisocyanate has high cyrstallinity and hence is likely to be solid.

The amount of the hydrophilic group, which is bonded to the hydrophilic polyisocyanate as component (a) of the polyisocyanate composition of the present invention, is from 2 to 50% by weight, based on the total weight of the base polyisocyanate and the hydrophilic group. When the hydrophilic group is present in an amount of less than 2% by weight, the surface tension cannot be satisfactorily lowered and hence the polyisocyanate composition cannot exhibit high emulsifiability. When the hydrophilic group is present in an amount of more than 50% by weight, the hydrophilicity of the highly emulsifiable polyisocyanate composition becomes too high, so that a reaction of the isocyanate group with water cannot be suppressed when the polyisocyanate composition is dispersed in water. Introduction of a hydrophilic group into a base polyisocyanate can be conducted by reacting the terminal isocyanate group of a base polyisocyanate with a hydrophilic group-providing compound, such as the above-mentioned polyethylene glycol monomethyl ether. Specifically, for example, introduction of a hydrophilic group into a base polyisocyanate can be conducted by a method in which the above-mentioned base polyisocyanate is mixed with a polyalkylene oxide monoalkyl ether alcohol and subsequently a conventional urethane-forming reaction is conducted. With respect to the conditions for the urethane-forming reaction, reference can be made, for example, to Examined Japanese Patent Application Publication No. 64-10023, Unexamined Japanese Patent Application Laid-Open Specification No. 58-38713 and Examined Japanese Patent Application Publication No. 63-89574.

The novel, highly emulsifiable polyisocyanate composition of the present invention can be obtained by mixing the above-mentioned hydrophilic polyisocyanate as component (a) with 0.5 to 20% by weight, based on the total weight of component (a) and component (b), of a substantially water-free ionic surfactant as component (b). The term "substantially water-free" used herein is intended to mean the condition in which water has been removed from the ionic surfactant to an extent such that, when the hydrophilic polyisocyanate (a) is mixed with the ionic surfactant (b), a foaming, a white turbidity, and an increase in viscosity do not occur any longer, which are likely to be caused due to a reaction between the terminal isocyanate groups contained in the hydrophilic polyisocyanate (a) and water contained in the ionic surfactant (b). Practically, an ionic surfactant having a water content of 1% by weight or less, based on the weight of the ionic surfactant, is regarded as being "substantially water-free".

The substantially water-free ionic surfactant as component (b) can be obtained by mixing a water-containing ionic surfactant with an organic solvent which is capable of dissolving the water-containing ionic surfactant therein and has a high boiling point, and subsequently removing the water contained in the ionic surfactant by, for example, heating. Examples of organic solvents to be mixed with a water-containing ionic surfactant include polyalkylene oxide monoalkyl ether alcohols, such as a polyethylene glycol monomethyl ether; and polyalkylene oxide dialkyl ethers, such as triethylene glycol dimethyl ether and diethylene glycol diethyl ether. Mixing of a water-containing ionic surfactant as such with a hydrophilic polyisocyanate as component (a) to obtain a polyisocyanate composition is not preferred because, when the terminal isocyanate groups contained in the hydrophilic polyisocyanate (a) are reacted with water contained in the ionic surfactant (b), a foaming, a white turbidity and an increase in viscosity are likely to occur. Further, it is to be noted that, when the water of the water-containing ionic surfactant is removed without mixing the water-containing ionic surfactant with an organic solvent having a high boiling point, the resultant ionic surfactant becomes solid, so that the ionic surfactant becomes incompatible with the hydrophilic polyisocyanate (a).

With respect to the ionic surfactant as component (b) of the polyisocyanate composition (B) of the present invention, whether an anionic surfactant or a cationic surfactant is chosen can be determined, depending on the type of an aqueous solution of or an aqueous emulsion of a polyol [component (A)] (each, hereinafter frequently referred to simply as an "aqueous polyol") which is used as a main agent and mixed with the polyisocyanate composition [component (B)] of the present invention in preparing an aqueous coating composition. For example, an appropriate choice of an ionic surfactant can be made referring to the following. For the purpose of improving the solubility and dispersibility of the polyol in water, it frequently occurs that an acid component, such as a carboxylic acid, sulfonic acid or the like, is introduced to the molecule of the polyol and then, the resultant polyol is neutralized with an alkali, such as sodium hydroxide, ammonia or the like. When the thus obtained polyol is used as component (A) of the aqueous coating composition of the present invention, it is preferred to employ an anionic surfactant as the ionic surfactant (b) of the polyisocyanate composition (B). In this case, when a cationic surfactant is employed as component (b) instead of an anionic surfactant, the aqueous polyol and the highly emulsifiable polyisocyanate composition may together form unfavorable aggregates. It also occurs that an alkali component, such as an amine or the like, is introduced to the molecule of the polyol and then, the resultant polyol is neutralized with an acid, such as hydrochloric acid. In this case, it is preferred to use a cationic surfactant. When an aqueous polyol is used as component (A) of the aqueous coating composition of the present invention without being neutralized, either of an anionic surfactant and a cationic surfactant can be employed as the ionic surfactant (b) of the polyisocyanate composition (B).

As suitable examples of anionic surfactants, a carboxylate type, a sulfate type, a sulfonate type and a phosphate type surfactant can mentioned. Specific examples of anionic surfactants include an ammonium ($C_1$–$C_{20}$ alkyl) benzenesulfonate, a sodium ($C_1$–$C_{20}$ alkyl) disulfate, a sodium alkyldiphenyl ether disulfonate, a sodium di($C_1$–$C_{20}$ alkyl) sulfosuccinate, a sodium polyoxyethylene $C_6$–$C_{30}$ aryl ether sulfonate and an ammonium polyoxyethylene $C_6$–$C_{30}$ aryl ether sulfonate.

As suitable examples of cationic surfactants, a quaternary ammonium salt, a pyridinium salt and an imidazolinium salt can be mentioned. Specific examples of cationic surfactants include a $C_1$–$C_{20}$ alkyl trimethyl ammonium bromide, a $C_1$–$C_{20}$ alkyl pyridinium bromide and imidazolinium laurate.

When the polyisocyanate composition contains less than 0.5% by weight, based on the total weight of component (a) and component (b), of ionic surfactant (b), even by the use of the ionic surfactant, it becomes impossible to obtain a stable aqueous dispersion when the polyisocyanate composition is mixed with water.

When the polyisocyanate composition contains more than 20% by weight, based on the total weight of component (a) and component (b), of ionic surfactant (b), an aqueous dispersion of such a composition is caused to have dispersion particles unfavorably having a small particle diameter. Therefore, in this case, when such a polyisocyanate composition is used in combination with an aqueous polyol to prepare an aqueous coating composition, various disadvantages are likely to occur, such that the produced coating has a short pot life, and that, because such a polyisocyanate composition disadvantageously has a large amount of components which do not participate in crosslinking of the polyol, a coating formed from the coating composition containing such a polyisocyanate composition becomes brittle.

In the present invention, by the use of an ionic surfactant in combination with a nonionic hydrophilic group, it becomes possible to obtain a highly emulsifiable polyisocyanate composition, which exhibits not only excellent dispersibility in water but also exhibits high stability in the form of an aqueous dispersion thereof, so that it can be advantageously used for producing an aqueous coating composition having a long pot life. The reason for this has not been elucidated yet, but considered to be as follows. When an aqueous coating composition is produced by mixing the highly emulsifiable polyisocyanate composition of the present invention with an aqueous polyol, it takes a unique structure such that each of globules of the polyisocyanate, which globules are formed in the aqueous coating composition, is protected by a double layer comprising an outer ionic surfactant layer formed at an interface between the globule and the water, and an inner nonionic hydrophilic group layer positioned on the side of the globule relative to the outer ionic surfactant layer, whereas the isocyanate groups of the polyisocyanate are positioned inside of the globule. The formation of this double layer-protected globule of the polyisocyanate is considered to contribute to the achievement of the above-mentioned advantages of the polyisocyanate composition and the aqueous coating composition produced therefrom.

In this connection, it should be noted that in each of Examined Japanese Patent Application Publication No. 55-7472, Unexamined Japanese Patent Application Laid-Open Specification No. 5-222150, Unexamined Japanese Patent Application Laid-Open Specification No. 6-17004, Unexamined Japanese Patent Application Laid-Open Specification No. 7-48429 and Unexamined Japanese Patent Application Laid-Open Specification No. 7-113005, only a nonionic hydrophilic group is used, so that the above-mentioned unique structure of double layer-protected globule is not formed.

When only a nonionic hydrophilic group is introduced to the polyisocyanate, it is possible to obtain a hydrophilic polyisocyanate composition having improved dispersibility in water. However, when such a polyisocyanate composition is used to prepare an aqueous coating composition, it is impossible to obtain an aqueous coating composition having a pot life at a practically employable level. The reason for this is considered to be as follows. When only a nonionic hydrophilic group is used, only a single protective layer of the nonionic hydrophilic group is formed at the interface between a polyisocyanate globule and water. Further, in this case, the interface between the globule and water cannot be satisfactorily protected by the nonionic hydrophilic group only. For this reason, when such a polyisocyanate composition, prepared using only a nonionic hydrophilic group, is dispersed in water, water intrudes into the interior of the globule of the polyisocyanate, thereby causing a reaction between the isocyanate group and water. Accordingly, the terminal isocyanate group remaining ratio of the hydrophilic polyisocyanate is lowered in a very short period of time.

On the other hand, when only an ionic surfactant is mixed with a polyisocyanate having no nonionic hydrophilic groups bonded thereto, the resultant polyisocyanate composition has a poor dispersibility in water, as compared to the highly emulsifiable polyisocyanate composition of the present invention which exhibits not only excellent dispersibility in water but also high stability in the form of an aqueous dispersion thereof.

The most important feature of the highly emulsifiable polyisocyanate composition of the present invention resides in the use of a combination of the nonionic hydrophilic group and the ionic surfactant. As already mentioned above, the mechanism of the effect of such a combination is considered to be such that, when the highly emulsifiable polyisocyanate composition of the present invention is dispersed in water, the double layer structure of the outer ionic surfactant layer and the inner nonionic surfactant layer is formed at the interface between a polyisocyanate globule and water, which double layer structure surely prevents water from intruding into the interior of the globule, so that the isocyanate groups positioned inside of the globules can be surely protected.

In the highly emulsifiable polyisocyanate composition of the present invention, the hydrophilic polyisocyanate having a hydrophilic group bonded thereto is mixed with a substantially water-free ionic surfactant. Differing from the present invention, when a polyisocyanate containing only a nonionic hydrophilic group is dispersed in water containing an ionic surfactant to obtain an aqueous dispersion, it is impossible to produce, from such an aqueous dispersion, an aqueous urethane coating composition having a long pot life. The reason for this is considered to be as follows. When the above-mentioned polyisocyanate containing only a nonionic hydrophilic group is dispersed in water containing an ionic surfactant, water surrounding the ionic surfactant is caused to be intruded into and occluded in the interior of the polyisocyanate globule during the formation of the polyisocyanate globule, thereby causing a reaction between the isocyanate groups and water. Accordingly, the unreacted terminal isocyanate group remaining ratio of the hydrophilic polyisocyanate is lowered only in a very short period of time.

In the present invention, it is preferred that the highly emulsifiable polyisocyanate composition have an isocyanate group content of from 3 to 25% by weight, a weight average molecular weight of from 350 to 10,000 and a viscosity of from 50 to 20,000 mPa·s at 25° C., each as measured with respect to the polyisocyanate composition in a condition such that the nonvolatile content thereof is substantially 100%.

In the present invention, the expression "a condition such that the nonvolatile content thereof is substantially 100%" means a condition wherein the highly emulsifiable polyisocyanate composition contains substantially no volatile, such as a solvent, and, more specifically, means a condition such that a highly emulsifiable polyisocyanate composition has a volatile content of not more than 1%.

In the present invention, it is preferred that the highly emulsifiable polyisocyanate composition have an isocyanate group content of from 3 to 25% by weight, as measured with respect to the polyisocyanate composition in a condition such that the nonvolatile content thereof is substantially 100%. When a polyisocyanate composition has an isocyanate group content of less than 3% by weight, the number of crosslinking sites in an aqueous coating composition prepared from the highly emulsifiable polyisocyanate composition and an aqueous polyol is likely to decrease. Therefore, not only is such a coating composition likely to exhibit a low curing rate, but also the coating formed from such a coating composition becomes brittle. When the isocyanate group content is more than 25% by weight, the amount of the nonionic hydrophilic groups in the polyisocyanate composition becomes small, so that the dispersibility of the composition in water is likely to be lowered.

In the present invention, as mentioned above, it is preferred that the highly emulsifiable polyisocyanate composition have a viscosity of from 50 to 20,000 mPa·s at 25° C., as measured in a condition such that the nonvolatile content of the composition is substantially 100%. When the polyisocyanate composition has a viscosity of more than 20,000 mPa·s, it becomes difficult to disperse such a composition in water satisfactorily. From the viewpoint of the dispersibility in water, it is preferred that the viscosity of the composition be low. However, when the viscosity of the polyisocyanate composition is less than 50 mPa·s, it means that the composition has a high content of diisocyanate, which has low crosslinking ability.

In the present invention, it is preferred that the highly emulsifiable polyisocyanate composition have a weight average molecular weight of from 350 to 10,000. When the polyisocyanate composition has a weight average molecular weight of less than 350, it becomes difficult to introduce to the composition a sufficient amount of a nonionic hydrophilic group for achieving a satisfactory dispersibility of the composition in water. When the polyisocyanate composition has a weight average molecular weight of more than 10,000, the viscosity thereof is likely to become too high, so that it becomes difficult to disperse the composition in water satisfactorily.

In the present invention, it is preferred that the highly emulsifiable polyisocyanate composition have a stability such that, when the composition is mixed with water in a weight ratio of 40:60 and the resultant mixture is stirred at 600 r.p.m. for 10 minutes to obtain an aqueous dispersion of the polyisocyanate composition, followed by allowing the aqueous dispersion to stand at 20° C. for 6 hours, at least 50% of the isocyanate groups remain unreacted, that is, the isocyanate group remaining ratio is at least 50%. When the polyisocyanate composition has an unreacted isocyanate group remaining ratio of less than 50%, the pot life of an aqueous coating composition produced from such a polyisocyanate composition and an aqueous polyol is likely to become short. Further, a coating formed from such an aqueous coating composition is likely to have poor water resistance and become brittle. The reason why such a high unreacted isocyanate group remaining ratio of at least 50% can be achieved in the present invention is believed to reside in that the reaction between the terminal isocyanate group and water is suppressed due to the use of the combination of the nonionic hydrophilic group and the ionic surfactant. In the above-mentioned aqueous dispersion, the highly emulsifiable polyisocyanate composition is dispersed in water in the form of an O/W type dispersion.

The highly emulsifiable polyisocyanate composition of the present invention exhibits high dispersibility in water and high stability. The terms "dispersibility in water" and "stability" used herein respectively mean the ability of the oil globules (polyisocyanate globules) to maintain a dispersion state and the stability of the terminal isocyanate groups in water as observed when the highly emulsifiable polyisocyanate composition is dispersed in water. The highly emulsifiable polyisocyanate composition of the present invention forms no precipitate even after an aqueous dispersion of the polyisocyanate composition is allowed to stand at 20° C. for 8 hours. Even when an aqueous dispersion of the polyisocyanate composition of the present invention is allowed to stand at 20° C. for 6 hours, the unreacted isocyanate group remaining ratio is 50% or more. Such excellent dispersibility and stability can be achieved by the combination of the ionic surfactant and the hydrophilic group introduced into the base polyisocyanate.

The method for producing the highly emulsifiable polyisocyanate composition of the present invention will be described below.

The highly emulsifiable polyisocyanate composition of the present invention can be produced by adding a nonionic hydrophilic group-providing compound (such as a polyalkylene oxide monoalkyl ether alcohol) to the above-mentioned base polyisocyanate selected from the group consisting of an aliphatic and/or an alicyclic diisocyanate, and a polyisocyanate derived therefrom, subjecting the resultant mixture to a urethane-forming reaction at 40° C. to 200° C. for several minutes to several days, and then adding thereto a substantially water-free ionic surfactant. When, e.g., a polyalkylene oxide monoalkyl ether alcohol (which is also capable of serving as a nonionic hydrophilic group-providing compound) is used as a high boiling point organic solvent in preparing a substantially water-free ionic surfactant, the polyisocyanate composition of the present invention can also be obtained by heating a mixture of a polyalkylene oxide monoalkyl ether alcohol and a water-containing ionic surfactant to effect dehydration of the ionic surfactant, and adding the resultant dehydration mixture to the base polyisocyanate, followed by a urethane-forming reaction.

For obtaining the highly emulsifiable polyisocyanate composition of the present invention, there can also be employed a method in which a polyalkylene oxide monoalkyl ether alcohol is added to the aliphatic and/or alicyclic diisocyanate before, during or after the reaction for forming a desired structure, such as a biuret structure, an isocyanurate structure, a urethane structure, a urethodione structure or an allophanate structure, and an urethane-forming reaction is conducted to form a nonionic hydrophilic group bonded to the above diisocyanate, followed by addition of a substantially water-free ionic surfactant, and if desired, a urethane-forming reaction is further conducted, and, if desired, unreacted aliphatic and/or alicyclic diisocyanate is distilled off. Alternatively, instead of the addition of only a polyoxyalkylene oxide monoalkyl ether alcohol, a mixture of a polyoxyalkylene oxide monoalkyl ether alcohol and a substantially water-free ionic surfactant can be used.

The highly emulsifiable polyisocyanate composition of the present invention can be used in mixture with an organic solvent. When the highly emulsifiable polyisocyanate composition is mixed with an organic solvent, since the viscosity becomes low, there are advantages such that the polyisocyanate composition exhibits an improved dispersibility in water, the unreacted isocyanate group remaining ratio becomes high and the pot life is prolonged. It is also requisite that the organic solvent have no functional groups reactive with an isocyanate group. It is requisite that the organic solvent be one which is miscible with the highly emulsifiable polyisocyanate composition of the present invention. Examples of such organic solvents include esters, such as ethyl acetate, propyl acetate, isopropyl acetate, butyl acetate, isobutyl acetate, pentyl acetate, methoxypropyl acetate, 3-methoxybutyl acetate, 2-ethylbutyl acetate, 2-ethylhexyl acetate, cyclohexyl acetate, methyl propionate, butyl propionate, butyl butyrate, dioctyl adipate and diisopropyl glutarate; ethers, such as diisopropyl ether, dibutyl ether, dioxane and diethoxy ethane; ketones, such as 2-pentanone, 3-pentanone, 2-hexanone, methylisobutyl ketone, 2-heptanone, 4-heptanone, diisobutyl ketone, isophorone, cyclohexanone and methylcyclohexanone; aromatic compounds, such as benzene, toluene, xylene, ethylbenzene, butylbenzene and p-cymene; polyethylene glycol dialkyl ethers, such as diethylene glycol dimethyl ether, diethylene glycol diethyl ether and triethylene glycol dimethyl ether; and polyethylene glycol dicarboxylates, such as diethylene glycol diacetate.

The amount of the organic solvent to be added to the highly emulsifiable polyisocyanate composition of the present invention is preferably in the range of from 1 to 50% by weight, based on the total weight of the polyisocyanate composition and the organic solvent. When the amount of the organic solvent to be added is less than 1% by weight, it is impossible to achieve the advantageous effects aimed at by adding the organic solvent to the polyisocyanate composition, i.e., the advantageous effects that not only can the dispersibility of the polyisocyanate composition be improved but also the pot life of the polyisocyanate composition can be prolonged. On the other hand, when the amount of the organic solvent is more than 50% by weight, the amount of volatile organic compounds in an aqueous coating composition obtained by mixing the polyisocyanate composition (containing the organic solvent) and an aqueous polyol, becomes unfavorably large.

As mentioned above, in another aspect of the present invention, there is provided an aqueous coating composition comprising an aqueous polyol having a hydroxyl value of from 1 to 300 mg KOH/g as component (A); and the above-mentioned highly emulsifiable polyisocyanate composition as component (B), wherein the equivalent ratio of the isocyanate groups of component (B) to the hydroxyl groups of component (A) is 0.5–5.0.

The polyol to be used in the present invention is a water-soluble polyol or a water-dispersible polyol. In the present invention, the water-soluble polyol and the water-dispersible polyol are used in the form of an aqueous solution and an aqueous emulsion, respectively.

The water-soluble polyol is a water-soluble resin having a hydroxyl group. The water-soluble polyol resins can be classified into two types of polyols, namely synthetic water-soluble polymers and natural water-soluble polymers.

Examples of synthetic water-soluble polymers include:

a (meth)acrylate resin comprising a copolymer obtained by reacting a $C_1$–$C_{12}$ alkyl (meth)acrylate with at least one hydroxyl group-containing compound, such as 2-hydroxyethyl (meth)acrylate or 2-hydroxylpropyl (meth)acrylate, and optionally with at least one unsaturated compound, such as (meth)acrylic acid, styrene, acrylonirile or acrylamide, wherein, when (meth)acrylic acid is used, a part or whole of the remaining (meth)acrylic acid may be neutralized using an alkali compound, such as sodium hydroxide or ammonia;

a polyester resin obtained by esterification of at least one polybasic acid, such as phthalic acid, isophthalic acid, terephthalic acid, maleic acid, fumaric acid, succinic acid, adipic acid, sebacic acid or anhydride thereof, with at least one polyhydric alcohol, such as (poly)ethylene glycol, (poly)propylene glycol, trimethylolpropane, pentaerythrite or sorbitol, wherein a part or whole of the remaining polybasic acid may be neutralized using an alkali compound, such as sodium hydroxide or ammonia;

a polyurethane resin obtained by a urethane-forming reaction of an aromatic diisocyanate, an aliphatic diisocyanate, an alicyclic diisocyanate or an isocyanate oligomer derived therefrom with at least one alcohol compound, such as a polyhydric alcohol [e.g., (poly)ethylene glycol, (poly)propylene glycol, trimethylolpropane, pentaerythritol, sorbitol or the like] or a hydroxycarboxylic acid [e.g., bishydroxymethylpropionic acid, hydroxyacetic acid or the like], wherein, when a hydroxycarboxylic acid is used, a part or whole of the remaining carboxylic acid may be neutralized using an alkali compound, such as sodium hydroxide or ammonia;

a vinyl acetate resin comprising a copolymer obtained by reacting vinyl acetate with at least one hydroxyl group-containing compound, such as 2-hydroxyethyl (meth)acrylate or 2-hydroxypropyl (meth)acrylate, and optionally with at least one unsaturated compound, such as (meth)acrylic acid, a $C_1$–$C_{12}$ alkyl (meth)acrylate or styrene, wherein, when (meth)acrylic acid is used, a part or whole of the (meth)acrylic acid may be neutralized;

an epoxy resin, such as a condensation product of epichlorohydrin with a polyhydric phenol;

a polyalkylene oxide polyol resin, such as polyethylene glycol, a compound obtained by bonding a polypropylene oxide group, polytetramethylene oxide group or the like to polyethylene glycol at a position intermediate both terminals of the repeating ethylene oxide units, or at one terminal or both terminals of the repeating ethylene oxide units by an addition reaction, or a compound obtained by random copolymerization of ethylene oxide with propylene oxide or tetrahydrofuran or the like; and a synthetic polymer, such as polyvinyl alcohol or a compound obtained by esterification of a part of hydroxyl groups of polyvinyl alcohol with a carboxylic acid compound or a sulfonic acid compound.

Examples of natural water-soluble polymers include methyl cellulose, hydroxyethyl cellulose and soluble starches.

Examples of water-dispersible polyols include resins having a hydroxyl group, which are dispersible in water. Specific examples of water-dispersible polyols include:

a polyvinylidene chloride polyol comprising a copolymer obtained by emulsion polymerization of vinylidene chloride with at least one hydroxyl group-containing compound, such as 2-hydroxyethyl (meth)acrylate or 2-hydroxypropyl (meth)acrylate, and optionally with at least one unsaturated compound, such as acrylonitrile, vinyl chloride, (meth)acrylic acid or a $C_1$–$C_{12}$ alkyl (meth)acrylate, wherein, when (meth)acrylic acid is used, a part or whole of the remaining (meth)acrylic acid may be neutralized;

a polyvinyl chloride polyol comprising a copolymer obtained by emulsion polymerization of vinyl chloride with at least one hydroxyl group-containing compound, such as 2-hydroxyethyl (meth)acrylate or 2-hydroxypropyl (meth)acrylate, and optionally with at least one unsaturated compound, such as acrylonitrile, (meth)acrylic acid, a $C_1$–$C_{12}$ alkyl (meth)acrylate or acrylamide, wherein, when (meth)acrylic acid is used, a part or whole of the remaining (meth)acrylic acid may be neutralized;

a vinyl acetate polyol obtained by emulsion polymerization of vinyl acetate with polyvinyl alcohol in an aqueous solution of the polyvinyl alcohol containing a catalyst;

a urethane polyol obtained by a urethane-forming reaction of an aromatic, aliphatic and/or alicyclic diisocyanate, or an isocyanate oligomer derived from the diisocyanate, with at least one alcohol compound, such as a polyhydric alcohol [e.g., (poly)ethylene glycol, (poly)propylene glycol, trimethylolpropane, pentaerythritol or sorbitol], or a hydroxycarboxylic acid (e.g., bishydroxypropionic acid or hydroxyacetic acid), wherein, when hydroxycarboxylic acid is used, a part or whole of the remaining carboxylic acid may be neutralized;

an acrylate polyol comprising a copolymer obtained by reacting a $C_1$–$C_{12}$ alkyl (meth)acrylate with at least one hydroxyl group-containing compound, such as 2-hydroxyethyl (meth)acrylate or 2-hydroxypropyl (meth)acrylate, and optionally with at least one unsaturated compound, such as (meth)acrylic acid, styrene or acrylamide, wherein, when (meth)acrylic acid is used, a part or whole of the remaining (meth)acrylic acid may be neutralized;

a fluoro copolymer polyol comprising a copolymer obtained by reacting at least one fluorine-containing unsaturated compound, such as vinylidene fluoride, vinyl fluoride, chlorotrifluoroethylene, tetrafluoroethylene or fluoro($C_1$–$C_{12}$ alkyl) (meth)acrylate, with at least one hydroxyl group-containing compound, such as 2-hydroxyethyl (meth)acrylate or 2-hydroxypropyl (meth)acrylate, and optionally with at least one unsaturated compound, such as a $C_1$–$C_{12}$ alkyl (meth) acrylate, (meth)acrylic acid, ethyl vinyl ether, hydroxybutyl vinyl ether or styrene, wherein, when (meth) acrylic acid is used, a part or whole of the remaining (meth)acrylic acid may be neutralized;

a styrene-butadiene copolymer polyol comprising a copolymer obtained by reacting styrene and butadiene with at least one hydroxyl group-containing compound, such as 2-hydroxyethyl (meth)acrylate or 2-hydroxypropyl (meth)acrylate, and optionally with at least one unsaturated compound, such as (meth)acrylic acid, acrylonitrile or acrylamide, wherein, when (meth) acrylic acid is used, a part or whole of the (meth)acrylic acid may be neutralized;

a polybutadiene polyol having terminal hydroxyl groups and terminal carboxyl groups, wherein a part or whole of the carboxyl groups may be neutralized; and a urethane acrylate polyol having a core-shell structure obtained by reacting the above-mentioned acrylate polyol with the above-mentioned urethane polyol.

The average particle diameter of the polyol dispersed in the aqueous polyol emulsion is from 0.01 to 1.0 $\mu$m. When the average particle diameter of the polyol of the aqueous polyol emulsion is less than 0.01 $\mu$m, the viscosity of the emulsion becomes too high, so that the emulsion cannot be used unless it has a low nonvolatile content. When the average particle diameter of the polyol of the aqueous polyol emulsion is more than 1.0 $\mu$m, the polyol in the form of an aqueous dispersion thereof cannot exhibit high stability.

The hydroxyl value of the polyol to be used in the present invention is from 1 to 300 mg KOH/g. When the hydroxyl value of the polyol is less than 1 mg KOH/g, the number of crosslinking sites in an aqueous coating composition, which is obtained from the polyisocyanate composition and an aqueous polyol, is likely to decrease. Therefore, not only is the coating composition likely to exhibit a low curing rate, but also the coating formed from the coating composition becomes brittle. On the other hand, when the hydroxyl value of the polyol is more than 300 mg KOH/g, the number of crosslinking sites in the aqueous coating composition becomes too large, so that the coating formed from the aqueous coating composition becomes too hard and brittle.

In the present invention, the equivalent ratio (NCO/OH) of the isocyanate groups of the highly emulsifiable polyisocyanate composition as component (B) to the hydroxyl groups of the aqueous polyol as component (A) is from 0.5 to 5.0, preferably from 1.0 to 3.0. When the NCO/OH equivalent ratio is less than 0.5, the number of crosslinking sites in an aqueous coating composition prepared from the highly emulsifiable polyisocyanate composition and an aqueous polyol is likely to decrease. Therefore, not only is the coating composition likely to exhibit a low curing rate, but also the coating formed from the coating composition becomes brittle. On the other hand, when the NCO/OH equivalent ratio is more than 5.0, the coating formed becomes too hard and brittle.

The water content in the above-mentioned aqueous polyol as component (A) is from 5 to 90% by weight, based on the total weight of the polyol and the water, or based on the total weight of the polyol, the water and the organic solvent when an organic solvent is added to component (A) as described below.

Component (A) may contain an organic solvent. Examples of organic solvents include aromatic hydrocarbons, such as benzene, toluene, xylene and chlorobenzene; alcohols, such as methanol, ethanol, i-propanol, n-butanol, n-hexanol and 2-ethylhexanol; ketones, such as acetone and methyl ethyl ketone; esters, such as ethyl acetate, n-butyl acetate, ethyl glycol acetate, methoxypropyl acetate and 3-hydroxy-2,2,4-trimethylpentyl isoacetate; and ethers, such as butyl glycol, tetrahydrofuran, dioxane and ethyl glycol ether.

When the aqueous polyol as component (A) contains an organic solvent, the amount of the organic solvent is up to 50% by weight, based on the total weight of the polyol, water and the organic solvent.

With respect to the aqueous coating composition comprising component (A) and component (B), it is preferred that a pot life be not shorter than 6 hours at 20° C. The term "pot life" used herein is intended to mean a period for which neither a remarkable increase in viscosity nor a foaming is observed with respect to the coating composition. If the pot life of the coating composition is shorter than 6 hours, such a coating composition is of no practical use. The prolonged pot life as long as not shorter than 6 hours can be achieved by the copresence of the nonionic hydrophilic group bonded to the polyisocyanate, and the ionic surfactant in the polyisocyanate composition of the present invention.

It is preferred that the aqueous coating composition of the present invention exhibit coating characteristics such that when a fresh 40 $\mu$m-thick coating of the aqueous coating composition is allowed to stand at 20° C. and a relative humidity of 65% for 24 hours, the resultant coating has a gel ratio of 50% or more. The gel ratio of less than 50% is not preferred because the water resistance of the coating is impaired. The reason why the coating having a gel ratio of 50% can be obtained resides in that, according to the present invention, a reaction between the terminal isocyanate groups of the polyisocyanate and water is suppressed when the polyisocyanate composition is in the form of an aqueous dispersion thereof.

The highly emulsifiable polyisocyanate composition and the aqueous coating composition of the present invention, if desired, can contain additives, such as pigments, dispersion stabilizers, viscosity modifiers, leveling agents, light stabilizers, antioxidants, ultraviolet absorbers, fillers, plasticizers, lubricants, and catalysts for promoting curing.

The highly emulsifiable polyisocyanate composition of the present invention exhibits not only excellent dispersibility in water, but also exhibits high stability in the form of an aqueous dispersion thereof, since a reaction between the terminal isocyanate groups and water is suppressed. Further, a cold crosslinkable, two-pack aqueous urethane coating composition, which comprises an aqueous polyol as a main agent and the polyisocyanate composition as a curing agent, has not only excellent pot life characteristics, but also is capable of forming a coating which has excellent properties, such as excellent water resistance. Therefore, such an aqueous coating composition can be advantageously used as an aqueous paint for building materials or automobiles, an aqueous paint for domestic use, an adhesive, a building material and various other coating materials and sealing materials. Further, the aqueous coating composition of the present invention can also be used as a crosslinking agent for use in a vehicle for an ink, a curing agent for use in cast molding, a crosslinking agent for a resin component such as an elastomer and for a urethane foam or the like, and a finish coating agent for a fiber and a textile fabric.

BEST MODE FOR CARRYING OUT THE INVENTION

Hereinbelow, the present invention will be described in more detail with reference to the following Examples and Comparative Examples, but they should not be construed as limiting the scope of the present invention.

In the following Examples and Comparative Examples, various properties were measured as follows.

(1) Measurement of the amount of isocyanate groups:

The content of isocyanate groups is defined as the amount (% by weight) of isocyanate groups in a polyisocyanate composition.

For measuring the amount of isocyanate groups, about 2 g of a polyisocyanate composition was measured for use as a sample. 20 ml of toluene and 20 ml of a 2N solution of n-dibutylamine in toluene were added to the polyisocyanate composition. The resultant mixture was allowed to stand at room temperature for 15 minutes, and the mixture was subjected to back titration using 1N hydrochloric acid. The amount of isocyanate groups was determined in accordance with the formula below. As an indicator, Bromocresol Green was used.

The amount (% by weight) of isocyanate groups=[(titer of blank titration)−(titer of sample titration)×42/[weight (g) of sample×1000]×100

The titer of blank titration means a titer obtained by conducting titration in substantially the same manner as mentioned above, except that the polyisocyanate composition was not used.

(2) Measurement of the amount of nonionic hydrophilic groups:

The amount of nonionic hydrophilic groups is defined as the amount (% by weight) of nonionic hydrophilic groups contained in a hydrophilic polyisocyanate [component (a); comprising a base polyisocyanate having bonded thereto a nonionic hydrophilic group containing therein repeating ethylene oxide units] in a highly emulsifiable polyisocyanate composition. The measurement of the amount of nonionic hydrophilic groups is conducted as follows: first, with respect to a sample of a highly emulsifiable polyisocyanate composition, the infrared absorption spectrum was taken, and the intensity of a peak (ascribed to the ether group) appearing at a wave number of 1,100 $cm^{-1}$ is measured to obtain a weight amount (X) of nonionic hydrophilic groups in the highly emulsifiable polyisocyanate composition, whereas the weight amount (Y) of ionic surfactant in the highly emulsifiable polyisocyanate composition is obtained by liquid chromatography. The amount of nonionic hydrophilic groups in the hydrophilic polyisocyanate is calculated by the following formula:

$$\frac{X}{Z-Y} \times 100\%$$

wherein the weight of the sample of the highly emulsifiable polyisocyanate composition is defined as Z.

(3) Measurement of the hydroxyl value of a polyol:

The hydroxyl value of a polyol is defined as the amount (mg) of KOH which is required for neutralizing acetic acid necessary for acetylation of free OH groups contained in 1 g of the polyol.

Measurement of the hydroxyl value of a polyol is conducted according to JIS-K0070.

(4) Measurement of an acid value of a polyol:

The acid value of a polyol is defined as the amount (mg) of KOH which is required for neutralizing free fatty acids contained in 1 g of the polyol.

Measurement of the acid value of a polyol is conducted according to JIS-K0070.

(5) Measurement of the nonvolatile content:

In the present invention, the term "nonvolatile content" is used in connection with a compound (e.g., polyethylene glycol monomethyl ether and the like) which can form a nonionic hydrophilic group, an ionic surfactant, an aqueous polyol and a highly emulsifiable polyisocyanate composition.

Amount (weight) of a nonvolatile is determined as follows: about 1.5 g of a sample is accurately weighed, and the sample is heated at 105° C. for 1 hour, whereupon the weight of the heated sample is measured. The weight of the heated sample is taken as the amount (weight) of the nonvolatile.

(6) Measurement of the viscosity of a highly emulsifiable polyisocyanate composition:

The viscosity of a highly emulsifiable polyisocyanate composition is defined as a viscosity (mPa·s) as measured at 25° C.

The viscosity is measured using a digital viscometer (model DVM-B, manufactured and sold by TOKYO KEIKI Co., Ltd., Japan) at 25° C. and at 60 rpm.

(7) Measurement of the weight average molecular weight of a highly emulsifiable polyisocyanate composition:

A sample of a highly emulsifiable polyisocyanate composition for measurement of the weight average molecular weight thereof is prepared by dissolving the polyisocyanate composition to tetrahydrofuran (THF) so that the final concentration of the polyisocyanate composition in THF becomes 0.25% by weight. The prepared sample is subjected to gel permeation chromatography (GPC) to thereby determine the weight average molecular weight thereof. When the weight average molecular weight is less than 2,000, the GPC is conducted using columns G1000HXL, G2000HXL and G3000HXL (each of which is manufactured and sold by TOSOH Corporation, Japan), and using THF as a carrier, wherein a refractive index detector (model HLC-802A, manufactured and sold by TOSOH Corporation, Japan) and a chromatoprocessor (CP-8000, manufactured and sold by TOSOH Corporation, Japan) are used. When the weight average molecular weight is 2,000 or more, the GPC is conducted using columns G2000HXL, G4000HXL and G5000HXL (each of which is manufactured and sold by TOSOH Corporation, Japan), and using THF as a carrier, wherein a refractive index detector (model RID.6A, manufactured and sold by SIMADZU Corporation, Japan) and a chromatoprocessor (Chromatocoder 21, manufactured and sold by TOSOH Corporation, Japan) are used.

(8) Evaluation on the dispersibility of a highly emulsifiable polyisocyanate composition in water:

A sample of a highly emulsifiable polyisocyanate composition was mixed with water in a weight ratio of 40:60 and the resultant mixture was stirred at 600 r.p.m. for 10 minutes to prepare an aqueous dispersion (O/W type) of the polyisocyanate composition. The aqueous dispersion was allowed to stand at 20° C. for 8 hours. The dispersibility in water was evaluated by visual observation of the dispersion. When no precipitate was observed, the polyisocyanate composition was determined to have good dispersibility.

(9) Measurement of the average particle diameter of polyol particles in an aqueous polyol emulsion:

The average particle diameter was measured using Microtrac Ultrafine Particle Analyzer (manufactured and sold by Leeds+Northrup Co., U.S.A.).

(10) Measurement of the gel ratio:

A mixture prepared by mixing an aqueous polyol emulsion with a predetermined amount of highly emulsifiable polyisocyanate composition was stirred at 600 r.p.m. for 10 minutes to thereby obtain an aqueous coating composition. The resultant composition was cured for 24 hours at 20° C. and at a relative humidity (RH) of 65%. The gel ratio was measured with regard to the obtained coating. 0.1 g of the obtained coating was subjected to extraction with 50 g of acetone at 20° C. for 24 hours. The gel ratio was calculated using the following formula:

Gel Ratio=(the weight of solids remaining after extraction with acetone for 24 hours/the original weight of the coating)×100 (%)

EXAMPLE 1

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with ammonium alkylbenzenesulfonate (ionic surfactant, Newcol 210 manufactured and sold by NIPPON NYUUKAZAI CO., LTD., Japan; and nonvolatile content=50% by weight) in a nonvolatile weight ratio of 3:1. The resultant mixture was subjected to distillation at 120° C. under a reduced pressure of 20 Torr, to thereby remove the volatiles [namely, water and solvent (methanol)] of Newcol 210. Subsequently, 1,000 g of a biuret type polyisocyanate, which is derived from hexamethylene diisocyanate (HDI), (Duranate 24A-100 manufactured and sold by Asahi Chemical Industry Co., Ltd., Japan) as a base polyisocyanate was mixed with 200 g of the above-obtained mixture (which had been subjected to distillation under reduced pressure), and a urethaneforming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 13.0% by weight, the amount of ionic surfactant was 4.2% by weight, the amount of isocyanate groups was 18.5% by weight, the weight average molecular weight was 1,000, and the viscosity was 3,200 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 90%, based on the original isocyanate groups.

EXAMPLE 2

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of a biuret type polyisocyanate, which is derived from HDI, (Duranate 24A-100 manufactured and sold by Asahi Chemical Industry Co., Ltd., Japan) as a base polyisocyanate was mixed with 300 g of the above-obtained mixture (which had been subjected to distillation under reduced pressure), and a urethane-forming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 16.7% by weight, the amount of ionic surfactant was 7.7% by weight, the amount of isocyanate groups was 16.6% by weight, the weight average molecular weight was 1,100, and the viscosity was 4,100 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 93%, based on the original isocyanate groups.

EXAMPLE 3

Polyethylene glycol monomethyl ether (nonionic hydrophilic group-providing compound, nonvolatile content=100% by weight; and average number of repeating ethylene oxide units=48.5) was mixed with ammonium polyoxyethylene nonylphenylether sulfonate (ionic surfactant, Newcol 560SF manufactured and sold by NIPPON NYUUKAZAI CO., LTD., Japan; and nonvolatile content=50% by weight) in a nonvolatile weight ratio of 4:1. The resultant mixture was subjected to distillation at 120° C. under a reduced pressure of 20 Torr, to thereby remove the volatiles [namely, water and solvent (methanol)] of Newcol 560SF. Subsequently, 1,000 g of a biuret type polyisocyanate, which is derived from HDI, (Duranate 24A-100 manufactured and sold by Asahi Chemical Industry Co., Ltd., Japan) as a base polyisocyanate was mixed with 30 g of the above-obtained mixture (which had been subjected to distillation under reduced pressure), and a urethane-forming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 2.3% by weight, the amount of ionic surfactant was 0.6% by weight, the amount of isocyanate groups was 21.6% by weight, the weight average molecular weight was 880, and the viscosity was 2,400 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 91%, based on the original isocyanate groups.

EXAMPLE 4

Polyethylene glycol monomethyl ether (nonionic hydrophilic group-providing compound, MPG-130 manufactured and-sold by NIPPON NYUUKAZAI CO., LTD., Japan; nonvolatile content=100% by weight; and average number of repeating ethylene oxide units=9.4) was mixed with sodium polyoxyethylene tridecyl ether sulfonate (ionic surfactant, Newcol 1305SN manufactured and sold by NIPPON NYUUKAZAI CO., LTD., Japan; and nonvolatile content=30% by weight) in a nonvolatile weight ratio of 1:1. The resultant mixture was subjected to distillation at 120° C.

under a reduced pressure of 20 Torr, to thereby remove the volatiles [namely, water and solvent (methanol)] of Newcol 1305SN. Subsequently, 1,000 g of a biuret type polyisocyanate, which is derived from HDI, (Duranate 24A-100 manufactured and sold by Asahi Chemical Industry Co., Ltd., Japan) as a base polyisocyanate was mixed with 400 g of the above-obtained mixture (which had been subjected to distillation under reduced pressure), and a urethane-forming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 16.6% by weight, the amount of ionic surfactant was 14.3% by weight, the amount of isocyanate groups was 14.9% by weight, the weight average molecular weight was 2,000, and the viscosity was 18,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 78%, based on the original isocyanate groups.

EXAMPLE 5

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with benzyl ammonium salt (ionic surfactant, Texnol R5(50) manufactured and sold by NIPPON NYUUKAZAI CO., LTD., Japan; and nonvolatile content=50% by weight) in a nonvolatile weight ratio of 1:1. The resultant mixture was subjected to distillation at 120° C. under a reduced pressure of 20 Torr, to thereby remove the volatiles [namely, water and solvent (methanol)] of Texnol R5(50). Subsequently, 1,000 g of a biuret type polyisocyanate, which is derived from HDI, (Duranate 24A-100 manufactured and sold by Asahi Chemical Industry Co., Ltd., Japan) as a base polyisocyanate was mixed with 300 g of the above-obtained mixture (which had been subjected to distillation under reduced pressure), and a urethane-forming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 13.0% by weight, the amount of ionic surfactant was 11.5% by weight, the amount of isocyanate groups was 16.4% by weight, the weight average molecular weight was 950, and the viscosity was 4,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 88%, based on the original isocyanate groups.

EXAMPLE 6

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with ammonium alkylbenzenesulfonate (ionic surfactant, Newcol 210 manufactured and sold by NIPPON NYUUKAZAI CO., LTD., Japan; and nonvolatile content=50% by weight) in a nonvolatile weight ratio of 5:2. The resultant mixture was subjected to distillation at 120° C. under a reduced pressure of 20 Torr, to thereby remove the volatiles [namely, water and solvent (methanol)] of Newcol 210. Subsequently, 1,000 g of an isocyanurate type polyisocyanate, which is derived from HDI, (Duranate TPA-100 manufactured and sold by Asahi Chemical Industry Co., Ltd., Japan) as a base polyisocyanate cyanate was mixed with 700 g of the above-obtained mixture (which had been subjected to distillation under reduced pressure), and a urethane-forming reaction was conducted at 120° C. for 2 hours, to thereby obtain a highly emulsifiable polyisocyanate composition which was a liquid having a slightly yellowish color. With respect to the obtained polyisocyanate composition, the amount of nonionic hydrophilic groups was 33.3% by weight, the amount of ionic surfactant was 13.3% by weight, the amount of isocyanate groups was 11.4% by weight, the weight average molecular weight was 1,400, and the viscosity was 9,600 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 82%, based on the original isocyanate groups.

EXAMPLE 7

Polyethylene glycol monomethyl ether (nonionic hydrophilic group-providing compound, MPG-130 manufactured and sold by NIPPON NYUUKAZAI CO., LTD., Japan; nonvolatile content=100% by weight; and average number of repeating ethylene oxide units=9.4) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of an isocyanurate type polyisocyanate, which is derived from HDI, (Duranate TPA-100 manufactured and sold by Asahi Chemical Industry Co., Ltd., Japan) as a base polyisocyanate was mixed with 300 g of the above-obtained mixture (which had been subjected to distillation under reduced pressure), and a urethane-forming reaction was conducted at 100° C. for 2 hours, to thereby obtain a highly emulsifiable polyisocyanate composition which was a liquid having a slightly yellowish color. With respect to the obtained polyisocyanate composition, the amount of nonionic hydrophilic groups was 16.7% by weight, the amount of ionic surfactant was 7.7% by weight, the amount of isocyanate groups was 16.6% by weight, the weight average molecular weight was 1,100, and the viscosity was 3,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 88%, based on the original isocyanate groups.

EXAMPLE 8

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 3:2. The resultant mixture was subjected to distillation at 120° C. under a reduced pressure of 20 Torr, to thereby remove the volatiles [namely, water and solvent (methanol)] of Newcol 290M. Subsequently, 1,000 g of a urethane type polyisocyanate, which is derived from HDI, (Duranate E-402 manufactured and sold by Asahi Chemical Industry Co., Ltd., Japan) as a base polyisocyanate was mixed with 150 g of the above-obtained mixture (which had been subjected to distillation under reduced pressure), and a urethane-forming reaction was conducted at 100° C. for 2 hours, to thereby obtain a highly emulsifiable polyisocyanate composition which was a liquid having a slightly yellowish color. With respect to the obtained polyisocyanate composition, the amount of nonionic hydrophilic groups was 8.3% by weight, the amount of ionic surfactant was 5.2% by weight, the amount of isocyanate groups was 7.9% by weight, the weight average molecular weight was 3,600, and the viscosity was 15,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 94%, based on the original isocyanate groups.

EXAMPLE 9

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of a biuret type polyisocyanate, which is derived from HDI and isophorone diisocyanate (IPDI), (Duranate 21S-75E manufactured and sold by Asahi Chemical Industry Co., Ltd., Japan; containing ethyl acetate as a solvent; and nonvolatile content=75% by weight) as a base polyisocyanate was mixed with 250 g of the above-obtained mixture (which had been subjected to distillation under reduced pressure), and a urethane-forming reaction was conducted at 90° C. for 5 hours, to thereby obtain a highly emulsifiable polyisocyanate composition which was a liquid having a slightly yellowish color. With respect to the obtained polyisocyanate composition, the amount of nonionic hydrophilic groups was 14.3% by weight, the amount of ionic surf actant was 6.7% by weight, and the nonvolatile content was 84.2% by weight. When the polyisocyanate composition was in a condition such that the nonvolatile content thereof is substantially 100%, the amount of isocyanate groups was 13.4% by weight, the weight average molecular weight was 2,300, and the viscosity was 18,000 mPa·s (25° C.). When the polyisocyanate composition was in a condition such that it contained the organic solvent, the amount of isocyanate groups was 11.3% by weight, and the viscosity was 2,200 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 90%, based on the original isocyanate groups.

EXAMPLE 10

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 26 g of a biuret type polyisocyanate, which is derived from HDI, (Duranate 24A-100 manufactured and sold by Asahi Chemical Industry Co., Ltd., Japan) as a base polyisocyanate was mixed with 400 g of the above-obtained mixture (which had been subjected to distillation under reduced pressure), and a urethane-forming reaction was conducted at 90° C. for 2 hours. To the resultant reaction mixture was added 1,000 g of Duranate 24A-100, and a urethane-forming reaction was further conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 20.6% by weight, the amount of ionic surfactant was 9.4% by weight, the amount of isocyanate groups was 15.0% by weight, the weight average molecular weight was 1,300, and the viscosity was 6,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 90%, based on the original isocyanate groups.

EXAMPLE 11

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of HDI and 7.1 g of water were mixed with 60 g of the above-obtained mixture (which had been subjected to distillation under reduced pressure), and a urethane-forming reaction and a biuret-forming reaction were conducted at 160° C. for 1 hour, to thereby obtain a reaction mixture.

The thus obtained reaction mixture was subjected to distillation twice by means of a flow-down type thin film-forming distillation apparatus at 150° C. under pressures of 0.3 Torr (1st distillation) and 0.2 Torr (2nd distillation), thereby removing unreacted HDI. Thus, a highly emulsifiable polyisocyanate composition was obtained.

The obtained highly emulsifiable polyisocyanate composition was a liquid having a slightly yellowish color. With respect to the obtained polyisocyanate composition, the yield was 25.2%, the amount of nonionic hydrophilic groups was 16.1% by weight, the amount of ionic surfactant was 7.4% by weight, the amount of isocyanate groups was 17.6% by weight, the weight average molecular weight was 900, and the viscosity was 2,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 91%, based on the original isocyanate groups.

EXAMPLE 12

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of HDI was mixed with 60 g of the above-obtained mixture (which had been subjected to distillation under reduced pressure), and a urethane-forming reaction was conducted at 90° C. for 2 hours, to thereby obtain a reaction mixture. When the refractive index of the reaction mixture was measured, it was found that the refractive index was 1.4493. To the obtained reaction mixture was added 0.05 g of tetramethylammonium caprate as an isocyanurate-forming catalyst to thereby effect an isocyanurate-forming reaction. The reaction was conducted at 90° C. for 4 hours. After that period of time, the refractive index of the resultant reaction mixture was measured, and when the refractive index became 1.4593 [that is, when a refractive index difference (ΔRI) from the value as measured before the isocyanurate-forming reaction became 0.01], 0.2 g of phosphoric acid was added to the reaction system to thereby terminate the reaction to obtain a reaction mixture.

The thus obtained reaction mixture was subjected to distillation twice by means of a flow-down type thin film-forming distillation apparatus at 150° C. under pressures of 0.3 Torr (1st distillation) and 0.2 Torr (2nd distillation), thereby removing unreacted HDI. Thus, a highly emulsifiable polyisocyanate composition was obtained.

The obtained highly emulsifiable polyisocyanate composition was a liquid having a slightly yellowish color. With respect to the obtained polyisocyanate composition, the yield was 28.2% the amount of nonionic hydrophilic groups was 14.3% by weight, the amount of ionic surfactant was 6.7% by weight, the amount of isocyanate groups was 17.3% by weight, the weight average molecular weight was 950, and the viscosity was 2,050 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 91%, based on the original isocyanate groups.

EXAMPLE 13

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with sodium dialkylsulfosuccinate (ionic surfactant, Newcol 290M manufactured and sold by NIPPON NYUUKAZAI CO., LTD., Japan; and nonvolatile content=70% by weight) in a nonvolatile weight ratio of 2:1. The resultant mixture was subjected to distillation at 120° C. under a reduced pressure of 20 Torr, to thereby remove the volatiles [namely, water and solvent (methanol)] of Newcol 290M. Subsequently, 1,000 g of HDI and 150 g of trifunctional polypropylene glycol (EXCENOL 840 manufactured and sold by Asahi Glass Co., Ltd., Japan) were mixed with 110 g of the above-obtained mixture (which had been subjected to distillation under reduced pressure), and a urethane-forming reaction was conducted at 90° C. for 2 hours, to thereby obtain a reaction mixture. When the refractive index of the reaction mixture was measured, it was found that the refractive index was 1.4496. To the obtained reaction mixture was added 0.05 g of tetramethylammonium caprate as an isocyanurate-forming catalyst to thereby effect an isocyanurate-forming reaction. The reaction was conducted at 90° C. for 4 hours. After that period of time, the refractive index of the resultant reaction mixture was measured, and when the refractive index became 1.4596 [that is, when a refractive index difference (ΔRI) from the value as measured before the isocyanurate-forming reaction became 0.01], 0.2 g of phosphoric acid was added to the reaction system to thereby terminate the reaction to obtain a reaction mixture.

The thus obtained reaction mixture was subjected to distillation twice by means of a flow-down type thin film-forming distillation apparatus at 150° C. under pressures of 0.3 Torr (1st distillation) and 0.2 Torr (2nd distillation), thereby removing unreacted HDI. Thus, a highly emulsifiable polyisocyanate composition was obtained.

The obtained highly emulsifiable polyisocyanate composition was a liquid having a slightly yellowish color. With respect to the obtained polyisocyanate composition, the yield was 46.2%, the amount of nonionic hydrophilic groups was 13.4% by weight, the amount of ionic surfactant was 6.3% by weight, the amount of isocyanate groups was 17.3% by weight, the weight average molecular weight was 1,600, and the viscosity was 2,000 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 93%, based on the original isocyanate groups.

EXAMPLE 14

Polyethylene glycol monomethyl ether (nonionic hydrophilic group-providing compound, MPG-081 manufactured and sold by NIPPON NYUUKAZAI CO., LTD., Japan; nonvolatile content=100% by weight; and average number of repeating ethylene oxide units=15.2) was mixed with a quaternary ammonium salt (ionic surfactant, Texnol SF manufactured and sold by NIPPON NYUUKAZAI CO., LTD., Japan; and nonvolatile content 100% by weight) in a nonvolatile weight ratio of 3:1 to thereby obtain a mixture. Subsequently, 1,000 g of a biuret type polyisocyanate, which is derived from HDI, (Duranate 24A-100 manufactured and sold by Asahi Chemical Industry Co., Ltd., Japan) as a base polyisocyanate was mixed with 200 g of the above-obtained mixture, and a urethane-forming reaction was conducted at 90° C. for 2 hours, to thereby obtain a highly emulsifiable polyisocyanate composition which was a liquid having a slightly yellowish color. With respect to the obtained polyisocyanate composition, the amount of nonionic hydrophilic groups was 13.0% by weight, the amount of ionic surfactant was 4.2% by weight, the amount of isocyanate groups was 18.7% by weight, the weight average molecular weight was 950, and the viscosity was 2,800 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 85%, based on the original isocyanate groups.

EXAMPLE 15

To 100 g of highly emulsifiable polyisocyanate composition obtained in Example 1 was added 100 g of butyl acetate as an organic solvent. The obtained highly emulsifiable polyisocyanate composition was a liquid having a slightly yellowish color. With respect to the obtained polyisocianate composition, the amount of nonionic hydrophilic groups was 6.5% by weight, and the amount of ionic surfactant was 2.1% by weight. When the polyisocyanate composition was in a condition such that the nonvolatile content thereof is substantially 100%, the amount of isocianate groups was 18.4% by weight, the weight average molecular weight was 1,000, and the viscosity was 3,200 mPa·s (25° C.). When the polyisocyanate composition was in a condition such that it contaned the organic solvent, the amount of isocyanate groups was 9.2% by weight, and the viscosity was 14 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 96%, based on the original isocyanate groups.

EXAMPLE 16

To 160 g of highly emulsifiable polyisocyanate composition obtained in Example 2 was added 40 g of methoxypropyl acetate as an organic solvent. The obtained highly emulsifiable polyisocyanate composition was a liquid having a slightly yellowish color. With respect to the obtained polyisocyanate composition, the amount of nonionic hydrophilic groups was 13.4% by weight, and the amount of ionic surfactant was 6.2% by weight. When the polyisocyanate composition was in a condition such that the nonvolatile content thereof is substantially 100%, the amount of isocyanate groups was 16.6% by weight, the weight average molecular weight was 1,100, and the viscosity was 4,100 mPa·s (25° C.). When the polyisocyanate composition was in a condition such that it contaned the organic solvent, the amount of isocyanate groups was 13.3% by weight, and the viscosity was 270 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 94%, based on the original isocyanate groups.

EXAMPLE 17

To 190 g of highly emulsifiable polyisocyanate composition obtained in Example 1 was added 10 g of diethyleneglycol diacetate as an organic solvent. The obtained highly emulsifiable polyisocyanate composition was a liquid having a slightly yellowish color. With respect to the obtained polyisocyanate composition, the amount of nonionic hydrophilic groups was 12.4% by weight, and the amount of ionic surfactant was 4.0% by weight. When the polyisocyanate composition was in a condition such that the nonvolatile content thereof is substantially 100%, the amount of isocyanate groups was 18.4% by weight, the weight average molecular weight was 1,000, and the viscosity was 3,200 mPa·s (25° C.). When the polyisocyanate composition was in a condition such that it contaned the organic solvent, the amount of isocyanate groups was 17.6% by weight, and the viscosity was 2,300 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 94%, based on the original isocyanate groups.

EXAMPLE 18

To 160 g of highly emulsifiable polyisocyanate composition obtained in Example 2 was added 40 g of diethyleneglycol diethylether as an organic solvent. The obtained highly emulsifiable polyisocyanate composition was a liquid having a slightly yellowish color. With respect to the obtained polyisocyanate composition, the amount of nonionic hydrophilic groups was 13.4% by weight, and the amount of ionic surfactant was 6.2% by weight. When the polyisocyanate composition was in a condition such that the nonvolatile content thereof is substantially 100%, the amount of isocyanate groups was 16.6% by weight, the weight average molecular weight was 1,100, and the viscosity was 4,100 mPa·s (25° C.). When the polyisocyanate composition was in a condition such that it contaned the organic solvent, the amount of isocyanate groups was 13.3% by weight, and the viscosity was 300 mPa·s (25° C.). When this highly emulsifiable polyisocyanate composition was dispersed in water, it exhibited a good dispersibility. Also, after the resultant aqueous dispersion was allowed to stand at 20° C. for 6 hours, the unreacted isocyanate group remaining ratio was 92%, based on the original isocyanate groups.

EXAMPLE 19

An acrylate polyol latex [polyol: a copolymer of styrene/methyl methacrylate/n-butyl acrylate/2-hydroxymethyl acrylate/methacrylic acid (20.9/17.4/26.0/34.8/0.9 in a weight ratio), having a hydroxyl value of 160 mg KOH/g, an acid value of 6 mg KOH/g, and a glass transition temperature (Tg) of 25° C.; latex: a latex having a nonvolatile content of 40% by weight and an ammonia-adjusted pH value of 5, wherein the average diameter of dispersed polyol particles is 0.09 μm] was mixed with the highly emulsifiable polyisocyanate composition obtained in Example 1 so that the equivalent ratio (NCO/OH) became 0.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at a relative humidity (RH) of 65% for 24 hours, thereby obtaining a transparent coating. The gel ratio of the obtained coating was measured and found to be 79%. Even after the coating was immersed in water at 20° C. for 4 hours, no whitening of the coating occurred.

EXAMPLE 20

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the highly emulsifiable polyisocyanate composition obtained in Example 2 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at a relative humidity (RH) of 65% for 24 hours, thereby obtaining a transparent coating. The gel ratio of the obtained coating was measured and found to be 84%. Even after the coating was immersed in water at 20° C. for 4 hours, no whitening of the coating occurred.

EXAMPLE 21

An acrylate polyol latex [polyol: a copolymer of styrene/methyl methacrylate/n-butyl acrylate/2-hydroxymethyl acrylate/methacrylic acid (9.2/44.0/45.8/0.9/0.1 in a weight ratio), having a hydroxyl value of 4 mg KOH/g, an acid value of 1 mg KOH/g, and a Tg of 10° C.; latex: a latex having a nonvolatile content of 40% by weight, and an ammonia-adjusted pH value of 5, wherein the average diameter of dispersed polyol particles is 0.2 μm] was mixed with the highly emulsifiable polyisocyanate composition obtained in Example 6 so that the equivalent ratio (NCO/OH) became 5.0, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at a relative humidity (RH) of 65% for 24 hours, thereby obtaining a transparent coating. The gel ratio of the obtained coating was measured and found to be 70%. Even after the coating was immersed in water at 20° C. for 4 hours, no whitening of the coating occurred.

EXAMPLE 22

A fluorine polyol latex (polyol: a polyol having a hydroxyl value of 10 mg KOH/g, an acid value of 2 mg KOH/g, and a Tg of 0° C.; latex: a latex having a nonvolatile content of 35% by weight, wherein the average diameter of dispersed polyol particles is 0.1 μm) was mixed with the highly emulsifiable polyisocyanate composition obtained in Example 2 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at an RH of 65% for 24 hours, thereby obtaining a transparent coating. The gel ratio of the obtained coating was measured and found to be 77%. Even after the coating was immersed in water at 20° C. for 4 hours, no whitening of the coating occurred.

EXAMPLE 23

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the highly emulsifiable polyisocyanate composition obtained in Example 10 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at an RH of 65% for 24 hours, thereby obtaining a transparent coating. The gel ratio of the obtained coating was measured and found to be 84%. Even after the coating was immersed in water at 20° C. for 4 hours, no whitening of the coating occurred.

EXAMPLE 24

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, wherein the average diameter of dispersed polyol particles is 0.08 μm] was mixed with the highly emulsifiable polyisocyanate composition obtained in Example 11 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at an RH of 65% for 24 hours, thereby obtaining a transparent coating. The gel ratio of the obtained coating was measured and found to be 82%. Even after the coating was immersed in water at 20° C. for 4 hours, no whitening of the coating occurred.

EXAMPLE 25

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the highly emulsifiable polyisocyanate composition obtained in Example 13 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 μm, and was allowed to stand at 20° C. and at. an RH of 65% for 24 hours, thereby obtaining a transparent coating. The gel ratio of the obtained coating was measured and found to be 81%. Even after the coating was immersed in water at 20° C. for 4 hours, no whitening of the coating occurred.

EXAMPLE 26

An acrylate polyol latex [polyol: a copolymer of styrene/methyl methacrylate/n-butyl acrylate/2-hydroxymethyl acrylate/2-(dimethylamino)ethyl methacrylate (6.3/31.9/32.5/23.1/6.2 in a weight ratio), having a hydroxyl value of 100 mg KOH/g, and a Tg of 25° C.; latex: a latex having a nonvolatile content of 45% by weight, and an ammonia-adjusted pH value of 5, wherein the average diameter of dispersed polyol particles is 0.10 pm] was mixed with the highly emulsifiable polyisocyanate composition obtained in Example 14 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 84%. Even after the coating was immersed in water at 20° C. for 4 hours, no whitening of the coating occurred.

EXAMPLE 27

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 µm] was mixed with the highly emulsifiable polyisocyanate composition obtained in Example 16 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 80%. Even after the coating was immersed in water at 20° C. for 4 hours, no whitening of the coating occurred.

EXAMPLE 28

An aqueous solution of a polyvinyl alcohol as a polyol (polyol: hydroxyl value=300 mg KOH/g; aqueous solution: nonvolatile content=40% by weight) was mixed with the highly emulsifiable polyisocyanate composition obtained in Example 1 so that the equivalent ratio (NCO/OH) became 0.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 91%. Even after the coating was immersed in water at 20° C. for 4 hours, no whitening of the coating occurred.

EXAMPLE 29

An aqueous solution of a polyethyleneglycol as a polyol (polyol: hydroxyl value=20 mg KOH/g; aqueous solution: nonvolatile content=45% by weight) was mixed with the highly emulsifiable polyisocyanate composition obtained in Example 1 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 88%. Even after the coating was immersed in water at 20° C. for 4 hours, no whitening of the coating occurred.

EXAMPLE 30

An aqueous solution of an acrylate polyol resin [polyol resin: a copolymer of styrene/methyl methacrylate/n-butyl acrylate/2-hydroxymethyl acrylate (22.2/65.6/6.7/5.5 in a weight ratio), having an acid value of 35 mg KOH/g and a hydroxyl value of 20 mg KOH/g; aqueous solution: nonvolatile content=42% by weight] was mixed with the highly emulsifiable polyisocyanate composition obtained in Example 2 so that the equivalent ratio (NCO/OH) became 1.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 90%. Even after the coating was immersed in water at 20° C. for 4 hours, no whitening of the coating occurred.

EXAMPLE 31

An aqueous solution of a polyvinyl alcohol as a polyol (polyol: hydroxyl value=300 mg KOH/g; aqueous solution: nonvolatile content=40% by weight) was mixed with a butyl acetate dilution of the highly emulsifiable polyisocyanate composition obtained in Example 2, which dilution had a nonvolatile content of 75%, so that the equivalent ratio (NCO/OH) became 0.5, thereby obtaining an aqueous coating composition. After a portion of the obtained coating composition was allowed to stand at 20° C. for 8 hours, neither an increase in viscosity nor a foaming was observed.

The coating composition obtained above was formed into a coating having a thickness of 40 µm, and was allowed to stand at 20° C. and at an RH of 65% for 24 hours, thereby obtaining a transparent coating. The gel ratio of the obtained coating was measured and found to be 89%. Even after the coating was immersed in water at 20° C. for 4 hours, no whitening of the coating occurred.

COMPARATIVE EXAMPLE 1

150 g of polyethylene glycol monomethyl ether (nonvolatile content=100% by weight; and average number of repeating ethylene oxide units=20.4) was mixed with 1,000 g of an isocyanurate type polyisocyanate (Duranate TPA-100 manufactured and sold by Asahi Chemical Industry Co., Ltd., Japan) as a base polyisocyanate, and a urethane-forming reaction was conducted at 100° C. for 2 hours, to thereby obtain a polyisocyanate composition which was a liquid having a slightly yellowish color. With respect to the obtained polyisocyanate composition, the amount of nonionic hydrophilic groups was 13.0% by weight, the amount of ionic surfactant was 0% by weight, the amount of isocyanate groups was 18.7% by weight, the weight average molecular weight was 1,300, and the viscosity was 2,800 mPa·s (25° C.). When this polyisocyanate composition was dispersed in water, it exhibited a good dispersibility. However, after the resultant aqueous dispersion was allowed to stand at 20° C. for 4 hours, the unreacted isocyanate group remaining ratio was 0%, based on the original isocyanate groups.

COMPARATIVE EXAMPLE 2

200 g of polyethylene glycol monomethyl ether (MPG-081 manufactured and sold by NIPPON NYUUKAZAI CO., LTD., Japan; nonvolatile content=100% by weight; and average number of repeating ethylene oxide units=15.2) was mixed with 1,000 g of a biuret type polyisocyanate (Duranate 24A-100 manufactured and sold by Asahi Chemical Industry Co., Ltd., Japan) as a base polyisocyanate, and a urethane-forming reaction was conducted at 90° C. for 2 hours, to thereby obtain a polyisocyanate composition which was a liquid having a slightly yellowish color. With respect to the obtained polyisocyanate composition, the amount of nonionic hydrophilic groups was 16.7% by weight, the amount of ionic surfactant was 0% by weight, the amount of isocyanate groups was 18.3% by weight, the weight average molecular weight was 1,200, and the viscosity was 2,300 mPa·s (25° C.). When this polyisocyanate composition was dispersed in water, it exhibited a good dispersibility. However, after the resultant aqueous dispersion was allowed to stand at 20° C. for 2 hours, the unreacted isocyanate group remaining ratio was 0%, based on the original isocyanate groups.

COMPARATIVE EXAMPLE 3

150 g of polyethylene glycol monomethyl ether (nonvolatile content=100% by weight; and average number of repeating ethylene oxide units=20.4) was mixed with 1,000 g of an isocyanurate type polyisocyanate (Duranate THA-100 manufactured and sold by Asahi Chemical Industry Co., Ltd., Japan) as a base polyisocyanate and further with 40 g of methyl ricinoleate, and a urethane-forming reaction was conducted at 100° C. for 2 hours, to thereby obtain a polyisocyanate composition which was a liquid having a slightly yellowish color. With respect to the obtained polyisocyanate composition, the amount of nonionic hydrophilic groups was 12.6% by weight, the amount of ionic surfactant was 0% by weight, the amount of isocyanate groups was 16.7% by weight, the weight average molecular weight was 1,500, and the viscosity was 2,300 mPa·s (25° C.). When this polyisocyanate composition was dispersed in water, it exhibited a good dispersibility. However, after the resultant aqueous dispersion was allowed to stand at 20° C. for 4 hours, the unreacted isocyanate group remaining ratio was 0%, based on the original isocyanate groups.

COMPARATIVE EXAMPLE 4

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the highly emulsifiable polyisocyanate composition obtained in Comparative Example 1 so that the equivalent ratio (NCO/OH) became 1.5, thereby obtaining an aqueous coating composition. After a portion of the obtained coating composition was allowed to stand at 20° C. for 6 hours, the hardening of the coating composition was observed.

The coating composition obtained above was formed into a coating having a thickness of 40 μm, and was allowed to stand at 20° C. and at an RH of 65% for 24 hours, thereby obtaining a slightly opaque coating. The gel ratio of the obtained coating was measured and found to be 81%. After the coating was immersed in water at 20° C. for 4 hours, the whitening of the coating occurred.

COMPARATIVE EXAMPLE 5

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the highly emulsifiable polyisocyanate composition obtained in Comparative Example 2 so that the equivalent ratio (NCO/OH) became 1.0, thereby obtaining an aqueous coating composition. After a portion of the obtained coating composition was allowed to stand at 20° C. for 6 hours, the hardening of the coating composition was observed.

The coating composition obtained above was formed into a coating having a thickness of 40 μm, and was allowed to stand at 20° C. and at an RH of 65% for 24 hours, thereby obtaining a transparent coating. The gel ratio of the obtained coating was measured and found to be 84%. After the coating was immersed in water at 20° C. for 4 hours, the swelling and whitening of the coating occurred.

COMPARATIVE EXAMPLE 6

An acrylate polyol latex [polyol: a copolymer of styrene/methyl methacrylate/n-butyl acrylate/2-hydroxymethyl acrylate/methacrylic acid (17.9/32.1/44.6/4.5/0.9 in a weight ratio), having a hydroxyl value of 20 mg KOH/g, an acid value of 6 mg KOH/g, and a Tg of 10° C.; latex: a latex having a nonvolatile content of 30% by weight, and an ammonia-adjusted pH value of 5, wherein the average diameter of dispersed polyol particles is 0.08 μm] was mixed with the polyisocyanate composition obtained in Comparative Example 3 so that the equivalent ratio (NCO/OH) became 1.0, thereby obtaining an aqueous coating composition. After a portion of the obtained coating composition was allowed to stand at 20° C. for 6 hours, the hardening of the coating composition was observed.

The coating composition obtained above was formed into a coating having a thickness of 40 μm, and was allowed to stand at 20° C. and at an RH of 65% for 24 hours, thereby obtaining a transparent coating. The gel ratio of the obtained coating was measured and found to be 86%. After the coating was immersed in water at 20° C. for 4 hours, the swelling and whitening of the coating occurred.

COMPARATIVE EXAMPLE 7

An aqueous solution of a polyvinyl alcohol as a polyol (polyol: hydroxyl value=20 mg KOH/g; aqueous solution: nonvolatile content=40% by weight) was mixed with the polyisocyanate composition obtained in Comparative Example 2 so that the equivalent ratio (NCO/OH) became 1.5, thereby obtaining an aqueous coating composition. After a portion of the obtained coating composition was allowed to stand at 20° C. for 3 hours, a foaming and an increase in viscosity were observed.

The coating composition obtained above was formed into a coating having a thickness of 40 μm, and was allowed to stand at 20° C. and at an RH of 65% for 24 hours, thereby obtaining a slight opaque coating. The gel ratio of the obtained coating was measured and found to be 80%. After the coating was immersed in water at 20° C. for 4 hours, slight whitening of the entire coating occurred.

INDUSTRIAL APPLICABILITY

The highly emulsifiable polyisocyanate composition of the present invention exhibits not only excellent dispersibility in water, but also exhibits high stability in the form of an aqueous dispersion thereof, since a reaction between the terminal isocyanate groups and water is suppressed. Further, a cold crosslinkable, two-pack aqueous urethane coating composition, which comprises an aqueous polyol as a main agent and the polyisocyanate composition as a curing agent, has not only excellent pot life characteristics, but also is capable of forming a coating which has excellent properties, such as excellent water resistance. Therefore, such an aqueous coating composition can be advantageously used as an aqueous paint for building materials or automobiles, an aqueous paint for domestic use, an adhesive, a building material and various other coating materials and sealing materials. Further, the aqueous coating composition of the present invention can also be used as a crosslinking agent for use in a vehicle for an ink, a curing agent for use in cast molding, a crosslinking agent for a resin component such as an elastomer and for a urethane foam or the like, and a finish coating agent for a fiber and a textile fabric.

We claim:
1. A polyisocyanate composition which comprises:
 (a) a hydrophilic polyisocyanate comprising:
  at least one base polyisocyanate selected from the group consisting of at least one diisocyanate selected from an aliphatic diisocyanate and an alicyclic diisocyanate, and a two or more terminal isocyanate groups-containing polyisocyanate derived from said at least one diisocyanate, and
  a nonionic hydrophilic group, bonded to said polyisocyanate, containing therein 5 to 50 repeating ethylene oxide units in terms of the average number of the units, wherein said hydrophilic group is present in an amount of from 2 to 50% by weight, based on the total weight of said base polyisocyanate and said hydrophilic group; and
 (b) 0.5 to 20% by weight, based on the total weight of component (a) and component (b), of a substantially water-free ionic surfactant.

2. The polyisocyanate composition according to claim 1, having an isocyanate group content of from 3 to 25% by weight, a weight average molecular weight of from 350 to 10,000 and a viscosity of from 50 to 20,000 mPa·s at 25° C., each as measured with respect to said polyisocyanate composition in a condition such that the nonvolatile content thereof is substantially 100%.

3. The polyisocyanate composition according to claim 1, further comprising an organic solvent in an amount of from 1 to 50% by weight, based on the total weight of said polyisocyanate composition and said organic solvent.

4. The polyisocyanate composition according to claim 3, wherein said organic solvent is at least one compound selected from the group consisting of a polyethylene glycol di($C_1$–$C_{10}$alkyl) ether and a polyethylene glycol dicarboxylate.

5. The polyisocyanate composition according to claim 1, wherein said at least one diisocyanate is selected from the group consisting of hexamethylene diisocyanate and isophorone diisocyanate.

6. The polyisocyanate composition according to claim 1, wherein said base polyisocyanate is at least one member selected from the group consisting of polyisocyanates having, in molecules thereof, a biuret structure, an isocyanurate structure, a urethane structure, a urethodione structure and an allophanate structure, respectively.

7. The polyisocyanate composition according to claim 1, wherein said ionic surfactant is anionic.

8. The polyisocyanate composition according to claim 7, wherein said anionic surfactant is at least one compound selected from the group consisting of an ammonium ($C_1$–$C_{20}$ alkyl)benzenesulfonate, a di($C_1$–$C_{20}$ alkyl) sulfosuccinate, a sodium polyoxyethylene $C_6$–$C_{30}$ aryl ether sulfonate, an ammonium polyoxyethylene $C_6$–$C_{30}$ aryl ether sulfonate and a sodium polyoxyethylene $C_1$–$C_{20}$ alkyl ether sulfonate.

9. The polyisocyanate composition according to claim 1, wherein said ionic surfactant is cationic.

10. The polyisocyanate composition according to claim 9, wherein said cationic surfactant is selected from the group consisting of a $C_1$–$C_{20}$ alkyl trimethyl ammonium bromide, a $C_1$–$C_{20}$ alkyl pyridinium bromide and imidazolinium laurate.

11. The polyisocyanate composition according to claim 1, which exhibits a stability such that, when the polyisocyanate composition is mixed with water in a weight ratio of 40:60 and the resultant mixture is stirred at 600 r.p.m. for 10 minutes to obtain an aqueous dispersion of the polyisocyanate composition, followed by allowing said aqueous dispersion to stand at 20° C. for 6 hours, at least 50% of the original isocyanate groups of said polyisocyanate composition remain unreacted.

12. An aqueous coating composition comprising:
 (A) an aqueous solution of or an aqueous emulsion of a polyol having a hydroxyl value of from 1 to 300 mg KOH/g; and
 (B) a polyisocyanate composition according to any one of claims 1 to 11,
  wherein the equivalent ratio (NCO/OH) of the isocyanate groups of component (B) to the hydroxyl groups of component (A) is 0.5–5.0, and
  wherein said components (A) and (B) are separately provided and are adapted to be mixed in use.

13. The aqueous coating composition according to claim 12, wherein the polyol of said aqueous emulsion is selected from the group consisting of a polyvinylidene chloride polyol, a polyvinyl chloride polyol, a vinyl acetate polyol, a urethane polyol, an acrylate polyol, a fluoro copolymer polyol, a styrene-butadiene copolymer polyol, a polybutadiene polyol, and a urethane acrylate polyol.

14. The aqueous coating composition according to claim 12, wherein said aqueous emulsion has the polyol dispersed therein as particles having an average diameter of from 0.01 to 1.0 μm.

15. The aqueous coating composition according to claim 12, which exhibits coating characteristics such that when a fresh 40 μm-thick coating of said aqueous coating composition is allowed to stand at 20° C. and a relative humidity of 65% for 24 hours, the resultant coating has a gel ratio of 50% or more.

* * * * *